(12) United States Patent
Erzen et al.

(10) Patent No.: US 11,608,185 B2
(45) Date of Patent: Mar. 21, 2023

(54) DRIVE SYSTEM FOR AN AIRCRAFT

(71) Applicant: Pipistrel Vertical Solutions D.O.O., Ajdovščina (SI)

(72) Inventors: David Erzen, Ljubljana (SI); Crtomir Gorup, Sezana (SI); Jure Tomazic, Ajdovščina (SI)

(73) Assignee: Pipistrel Vertical Solutions D.O.O., Ajdovscina (SI)

( * ) Notice: Subject to any disclaimer, the term of this patent is extended or adjusted under 35 U.S.C. 154(b) by 280 days.

(21) Appl. No.: 16/955,258

(22) PCT Filed: Dec. 21, 2018

(86) PCT No.: PCT/EP2018/086592
§ 371 (c)(1),
(2) Date: Jun. 18, 2020

(87) PCT Pub. No.: WO2019/122333
PCT Pub. Date: Jun. 27, 2019

(65) Prior Publication Data
US 2020/0391877 A1 Dec. 17, 2020

(30) Foreign Application Priority Data
Dec. 22, 2017 (DE) .................. 10 2017 131 258.7

(51) Int. Cl.
*B60L 50/50* (2019.01)
*B64D 27/24* (2006.01)
(Continued)

(52) U.S. Cl.
CPC .............. *B64D 27/24* (2013.01); *B60L 50/50* (2019.02); *B60W 10/04* (2013.01); *B64D 31/06* (2013.01);
(Continued)

(58) Field of Classification Search
CPC ........ B64D 27/24; B64D 31/06; B64D 35/00; B64D 2027/026; B60L 50/50; B60L 2200/10; B60W 10/04; B64C 2201/042
(Continued)

(56) References Cited

U.S. PATENT DOCUMENTS

2012/0025032 A1 2/2012 Hopdjanian et al.
2018/0127104 A1 5/2018 Kobayashi et al.
2018/0201384 A1 7/2018 Barth et al.

FOREIGN PATENT DOCUMENTS

DE 102014224637 A1 6/2016
DE 112015001403 T5 12/2016
(Continued)

OTHER PUBLICATIONS

Notification of Transmittal of Translation of the International Preliminary Report on Patentability issued in International Application No. PCT/EP2018/086592 dated Jul. 2, 2020.

*Primary Examiner* — Daniel Kessie
*Assistant Examiner* — Dru M Parries
(74) *Attorney, Agent, or Firm* — Hoffmann & Baron, LLP

(57) ABSTRACT

Drive system for an aircraft, including: a propeller; electric motor; transmission system for transmitting positive torque from the motor to drive the propeller and negative torque from the propeller in windmill braking state to drive the motor; interface for inputting an input; first unit for controlling torque acting on the motor; second unit for detecting rotational speed of the motor; selection unit to select an active mode from propulsion mode and recovery mode, wherein the motor generates recovery energy in the recovery mode; and management system to control energy flow in an electrical system of the aircraft, the electrical system including the motor, is controlled according to the active mode; wherein the selection unit is configured to select the active mode according to the input, rotational speed, and pre-
(Continued)

defined envelope, wherein the envelope indicates a maximum positive torque and minimum negative torque that depends on the rotational speed.

16 Claims, 1 Drawing Sheet

(51) Int. Cl.
    *B64D 31/06*     (2006.01)
    *B60W 10/04*     (2006.01)
    *B64D 35/00*     (2006.01)
    *B64D 27/02*     (2006.01)

(52) U.S. Cl.
    CPC .......... *B64D 35/00* (2013.01); *B60L 2200/10* (2013.01); *B64C 2201/042* (2013.01); *B64D 2027/026* (2013.01)

(58) Field of Classification Search
    USPC .......................................................... 244/62
    See application file for complete search history.

(56) References Cited

FOREIGN PATENT DOCUMENTS

| | | |
|---|---|---|
| DE | 102015213026 A1 | 1/2017 |
| EP | 2865598 A1 | 4/2015 |
| FR | 2976555 A1 | 12/2012 |
| WO | 2014204549 A2 | 12/2014 |

DRIVE SYSTEM FOR AN AIRCRAFT

CROSS REFERENCE TO RELATED APPLICATIONS

This application is the U.S. National Phase of, and Applicant claims priority from, International Patent Application No. PCT/EP2018/086592, filed on 21 Dec. 2018, and German Patent Application No. DE 10 2017 131 258.7, filed on 22 Dec. 2017, both of which are incorporated herein by reference in their entirety.

BACKGROUND

The invention relates to a drive system for an aircraft, in particular an aircraft having an electric drive or a hybrid drive (combination of an internal combustion engine (for example a piston engine or a gas turbine) and an electric motor), wherein a propeller is driven by an electric motor.

SUMMARY

The object of the invention is to provide a drive system for an aircraft that allows simple operation by the pilot.

The invention results from the features of the independent claims. Advantageous further refinements and embodiments are the subject of the dependent claims. Further features, potential applications, and advantages of the invention result from the following description and from the explanation of embodiments of the invention, which are shown in the drawings.

A first aspect of the invention relates to a drive system for an aircraft, wherein the drive system includes: a propeller P having propeller blades; an electric motor E; a transmission system to mechanically transmit a positive torque $T_+$ from the electric motor E to drive the propeller P and to transmit a negative torque $T_-$ from the propeller P in a windmill braking state on the electric motor E; a first input interface to input an input IN1; a first unit to control a torque T acting on the electric motor E, where $T \in \{T_-, 0, T_+\}$ and $T_- \leq 0$ and $T_+ \geq 0$, a second unit to detect a rotational speed $RPM_E$ of the electric motor E; a selection unit to select an active mode AM from a propulsion mode PM and a recovery mode RM, where $AM \in \{PM, RM\}$, wherein the electric motor E generates electrical recovery energy $E_{recup}$ in the recovery mode RM; and an energy management system, which controls an energy flow in an electrical system of the aircraft, the system including the electric motor E, according to the active mode AM; wherein the selection unit is configured and designed in such a way that the active mode AM is selected according to an input IN1 in the first input interface, according to the rotational speed $RPM_E$ of the electric motor E and according to a predefined envelope, wherein the envelope indicates a maximum positive torque $Max(T_+)$ and a minimum negative torque $Min(T_-(RPM_E))$ that depends on a rotational speed $RPM_E$ of the electric motor E, or respective values that depend on same, wherein, for the torque T acting on the electric motor E, $T = T(RPM_E) \in [Min(T_-(RPM_E)), \ldots, Max(T_+)]$.

The propeller advantageously has at least two propeller blades that are advantageously adjustable in the angle of attack. The propeller (or the propeller blades) turns advantageously in the free atmosphere or in a fan duct as a so-called jacket propeller.

The electric motor E is advantageously designed as an asynchronous or synchronous motor.

The transmission system is used to transmit torques between the electric motor E and the propeller P. The transmission system advantageously represents a mechanical connection between the electric motor E and the propeller. The transmission system advantageously has one or more transmission shafts, gears, or bearings. The transmission system can advantageously have one or more sensors that detect parameters such as, for example: a current rotational speed $RPM_E$ of the electric motor E, a current rotational speed $RPM_P$ of the propeller, a torque T currently acting on the electric motor E, etc.

The torque T acting on the electric motor E can either be a positive torque $T_+$, at which the electric motor E drives the propeller, or a negative torque $T_-$, at which the propeller P is in a windmill braking state, that is to say a state in which the propeller is driven by the incoming air like a windmill, which drives the electric motor E. The following applies: $T \in \{T_-, 0, T_+\}$ and $T_- \leq 0$ and $T_+ \geq 0$.

In the propulsion mode PM, the electric motor E generates a torque that is transmitted to the propeller and drives it. In the recovery mode RM, the electric motor E works as an electrical generator, energy (electrical recovery energy $E_{recup}$) being generated based on the airflow flowing toward or driving the propeller. The following convention is assumed in the present case. A positive torque $T_+$ receives a positive sign, a negative torque $T_-$ receives a negative sign.

The first input interface can advantageously be operated mechanically by a pilot. The first input interface advantageously includes a selector lever or a slide or a rotary knob, which in each case allows input between a first position ("zero position") and a second position ("max position"). The selector lever is designed, in particular in the cockpit, analogous to a selector lever for setting the throttle or the engine power. An input IN1 in the first input interface advantageously defines the power to be output by the electric motor E for driving the propeller.

The first unit is advantageously designed as an electronic control unit and is connected, for example, to a unit for adjusting the current angle of attack of the propellers and/or a unit for controlling the energy flow to the electric motor E.

The second unit advantageously includes a speed sensor for detecting the current rotational speed $RPM_E$ of the electric motor E or a variable derived therefrom.

The selection unit advantageously includes an electronic unit, which selects the active mode AM as a function of an input IN1 into the first input interface, as a function of the rotational speed $RPM_E$ of the electric motor E and as a function of a predefined envelope according to a predefined relationship.

The envelope specifies or defines, depending on a rotational speed $RPM_E$ of the electric motor E or a quantity derived therefrom, an allowed maximum positive torque $Max(T_+)$ and an allowed minimum negative torque $Min(T_-(RPM_E))$ according to a speed $RPM_E$ of the electric motor E or depending values. The permitted maximum positive torque $Max(T_+)$ can be predefined independently of the rotational speed, for example as a constant. Alternatively, the permitted maximum positive torque $Max(T_+)$ can also be predefined depending on the rotational speed. A permitted range is advantageously defined for the rotational speed $RPM_E$ of the electric motor E, for example [0, ..., $RPM_{E,MAX}$], wherein $RPM_{E,MAX}$ indicates a permitted maximum value for the rotational speed $RPM_E$ of the electric motor E. The permitted minimum negative torque $Min(T_-(RPM_E))$ advantageously varies with the rotational speed $Max(T_+)$ and/or $Min(T_-(RPM_E))$ and is advantageously predefined in the form of a table or in the form of mathematical functions. The following applies to the torque T acting on the electric motor E: $T=T(RPM_E)\epsilon[Min(T_-(RPM_E)), \ldots, Max(T_+)]$.

The proposed drive system allows automatic selection between propulsion mode PM and a recovery mode RM of the drive system, taking into account a torque input into the transmission system that is dependent on the flight condition and originates from the propeller (windmill braking state) in the transmission system. The operation of the drive system by the pilot is considerably simplified and the workload of the pilot by the proposed drive system is considerably reduced.

An advantageous development of the proposed drive system is characterized in that the input IN1 represents a percentage P: $P(IN1)\epsilon[0\% \ldots 100\%]$, and the selection unit is designed and set up in such a way that the recovery mode RM is selected as the active mode AM when the percentage P(IN1) related to the value range $[Min(T_-(RPM_E)), \ldots, MAX(T_+)]$ represents a negative torque $T(IN1, RPM_E)$, for which $T-=T(IN1, RPM_E)<0$ and/or $T(IN1, RPM_E)<T-*$, where $T-*<0$ indicates a limit for a negative torque $T_-$, and where: $P(IN1)=0\%$ represents $Min(T_-(RPM_E))$ and $P(IN1)=100\%$ represents $MAX(T_+)$. If, for example, the first input interface is designed as an actuating lever, it results in the input IN1="zero" position→P(IN1)=0%, the input IN1="max" position→P(IN1)=100%, and a linearly dependent percentage value between 0% and 100% for each intermediate position of the control lever.

For example, by an input from a pilot in the first input interface, a percentage value P(IN1)=30% is selected. At this percentage value P(IN1)=30%, and based on the known current rotational speed $RPM_E$ of the electric motor, an associated torque value $T(IN1, RPM_E)$ will now be determined in the value range $[Min(T_-(RPM_E)), \ldots, MAX(T_+)]$. The following applies: P(IN1)=0% corresponds to the minimum value: $Min(T_-(RPM_E))$, P(IN1)=100% corresponds to the maximum value $MAX(T_+)$, and P(IN1)=30% corresponds to: $T(P(IN1)=30\%, RPM_E)=Min(T_-(RPM_E))+0.3*[MAX(T_+)-Min(T_-(RPM_E))]$, where: $Min(T_-(RPM_E))<0$. Depending on the flight condition, $T(P(IN1)=30\%, RPM_E)<0$, so that despite the pilot's predefined performance, for example due to a strong descent of the aircraft, a total of a torque is transferred from the propeller to the electric motor E and drives the electric motor E. If this example shows that: $T(P(IN1)=30\%, RPM_E)<0$, the recovery mode RM is selected as the current mode AM. This is preferably done automatically, i.e., without the pilots intervention.

An advantageous further development of the proposed drive system is characterized in that: $MAX(T_+)=MAX(T_+(RPM_E))$. In this case, the envelope limiting the maximum value of positive torques $T_+$ is predefined as a function of the speed.

An advantageous development of the proposed drive system is characterized in that a third unit for detecting the torque T acting on the electric motor E is present. The third unit is preferably the electric motor itself and/or a (rotational) torque sensor. The torque acting on the electric motor E is preferably detected by the electric motor E itself or determined by a corresponding evaluation unit. Alternatively or additionally, a torque sensor is advantageously provided for detecting the torque T acting on the electric motor E.

An advantageous development of the proposed drive system is characterized in that the first unit for controlling a torque T acting on the electric motor E is designed and set up to control a detected negative torque $T=T_-$ depending on the input IN1.

The first unit is advantageously designed and set up to control a detected negative torque $T=T_-$ depending on at least one from the following list:
- an energy content of a battery connected to the electric motor,
- a charging current to a battery connected to the electric motor,
- a predefined minimum and/or maximum of this charging current,
- a temperature of the electric motor and/or a battery,
- a predefined minimum and/or maximum of this temperature,
- a state of the electric motor and/or the battery,
- a predefined minimum and/or maximum of this state,
- a current and/or a predefined speed of the aircraft,
- a predefined minimum and/or maximum of this speed,
- a current and/or predefined sink rate of the aircraft,
- a predefined minimum and/or maximum of this sink rate,
- a rotational speed of the propeller and/or the electric motor,
- a predefined minimum and/or maximum of this rotational speed,
- the currently generated electrical recovery energy $E_{recup}$,
- a predefined minimum and/or maximum of this electrical recovery energy $E_{recup}$,
- the current torque T, which is transmitted from the propeller to the electric motor E,
- a predefined minimum and/or maximum of this torque T
- flight altitude and outside temperature, and
- angle of attack of the propeller blades.

An advantageous development of the proposed drive system is characterized in that a second input interface is present, wherein an input IN2 in the second input interface specifies a rotational speed $RPM_E$ of the electric motor or a rotational speed $RPM_P$ of the propeller. The first input interface and the second input interface thus allow the engine power and the propeller speed to be set separately, as is known from airplanes.

The first unit is advantageously designed and set up to set the torque T acting on the electric motor E by adjusting the electrical energy flow to/from the electric motor and/or by adjusting an angle of attack of propeller blades of the propeller. This ensures in particular that the drive system is operated within the (permissible) envelope.

A foremost further development of the proposed drive system is characterized in that: wherein a sink for electrical recovery energy $E_{recup}$ and/or a storage for electrical recovery energy $E_{recup}$ is present, wherein the sink and/or the storage are connected to the energy management system, and wherein the energy management system controls the usage of the electrical recovery energy $E_{recup}$. The storage for electrical recovery energy $E_{recup}$ is advantageously an electric battery, or a flywheel, or a hydrogen tank. The electric battery in the propulsion mode PM advantageously provides electrical energy to drive the electric motor E. The sink for electrical recovery energy $E_{recup}$ is advantageously an air conditioning system of the aircraft, and/or an electrical heating system of the aircraft, and/or an electrical deicing system of the aircraft.

The energy management system is advantageously designed and set up in such a way that in the recovery mode PM all of the electrical recovery energy $E_{recup}$ generated is directed into the storage for electrical recovery energy $E_{recup}$ until a predefined maximum storage capacity of the storage is reached, and then is directed to the sink for electrical recovery energy $E_{recup}$.

Alternatively, the energy management system is designed and set up such that the electrical recovery energy $E_{recup}$ generated in the recovery mode PM is directed to the storage for electrical recovery energy $E_{recup}$ and/or to the sink for electrical recovery energy $E_{recup}$ depending on an aircraft state. The aircraft state is advantageously determined by at least one from the following list:
- configuration of the aircraft,
- kinematic state of the aircraft,
- state of the electrical system of the aircraft,
- aerodynamic state of the aircraft,
- physical state of the atmosphere surrounding the aircraft, and
- structural boundary conditions, e.g., rotational speed limit of the propeller.

The first unit is advantageously designed and set up to use the envelope to control the torque T acting on the electric motor E. The first unit is advantageously designed and set up to determine $Max(T_+)$ of the envelope based on the current rotational speed $RPM_E$ of the electric motor E.

The selection unit is advantageously designed and set up to determine $Min(T_-(RPM_E))$ of the envelope based on a rotational speed $RPM_P$ of the propeller P, the following being true during a flight: $RPM_P \neq 0$.

An advantageous development of the proposed drive system is characterized in that the display unit is designed to display one or more of the following information:
- information about a negative torque $T_-$ with which the electric motor E is driven,
- a parameter that depends on $T_-$,
- information about a positive torque $T_-$, with which the propeller P is driven by the electric motor E,
- a parameter that depends on $T_+$,
- information about the current mode AM, and
- the currently generated electrical recovery energy $E_{recup}$ or a quantity derived from it.

Another aspect of the invention relates to an aircraft having a drive system as described above.

Another aspect of the invention relates to a method of operating a drive system for an aircraft, the drive system including: a propeller having propeller blades; an electric motor; a transmission system for mechanically transmitting a positive torque $T_-$, from the electric motor E to drive the propeller and for transmitting a negative torque T from the propeller in a windmill braking state to drive the electric motor E; a first input interface for inputting an input IN1; a first unit for controlling a torque T acting on the electric motor E, where $T \in \{T_-, 0, T_+\}$ and $T_- \leq 0$ and $T_+ \geq 0$, a second unit to detect a rotational speed $RPM_E$ of the electric motor E; a selection unit to select an active mode AM from a propulsion mode PM and a recovery mode RM, where $AM \in \{PM, RM\}$, wherein the electric motor E generates electrical recovery energy $E_{recup}$ in the recovery mode RM; and an energy management system to control an energy flow in an electrical system of the aircraft, the system including the electric motor E, according to the active mode AM; wherein the method includes the following steps: selecting the active mode AM by the selection unit according to an input IN1 in the first input interface, according to the rotational speed $RPM_E$ of the electric motor E and according to a predefined envelope, wherein the envelope indicates a maximum positive torque $Max(T_+)$ and a minimum negative torque $Min(T_-(RPM_E))$ that depends on a rotational speed $RPM_E$ of the electric motor E, or respective values that depend on same, wherein, for the torque T acting on the electric motor E, $T=T(RPM_E) \in [Min(T_-(RPM_E)), \ldots, Max(T_+)]$.

An advantageous development of the proposed method is characterized in that the input IN1 represents a percentage P: $P(IN1) \in [0\% \ldots 100\%]$, and the selection unit then selects the recovery mode RM as the active mode AM, when the percentage P(IN1) in relation to the value range $[Min(T_-(RPM_E)), \ldots, MAX(T_+)]$ represents a negative torque $T(IN1, RPM_E)$, for which $T_-=T(IN1, RPM_E)<0$ and/or $T(IN1, RPM_E)<T-*$, where $T-*<0$ indicates a limit for a negative torque $T_-$, and where: $P(IN1)=0\%$ represents $Min(T_-(RPM_E))$ and $P(IN1)=100\%$ represents $MAX(T_+)$. Preferably, the following applies: $MAX(L)=MAX(T_+(RPM_E))$.

A foremost development of the proposed method is characterized in that the torque T acting on the electric motor is detected by a third unit. The first unit advantageously controls a detected negative torque $T=T_-$ depending on an input IN1. The first unit advantageously controls a detected negative torque $T=T_-$ depending on at least one from the following list:
- an energy content of a battery connected to the electric motor,
- a charging current to a battery connected to the electric motor,
- a predefined minimum and/or maximum of this charging current,
- a temperature of the electric motor and/or a battery,
- a predefined minimum and/or maximum of this temperature,
- a state of the electric motor and/or the battery,
- a predefined minimum and/or maximum of this state,
- a current and/or a predefined speed of the aircraft,
- a predefined minimum and/or maximum of this speed,
- a current and/or predefined sink rate of the aircraft,
- a predefined minimum and/or maximum of this sink rate,
- a rotational speed of the propeller and/or the electric motor,
- a predefined minimum and/or maximum of this rotational speed,
- the currently generated electrical recovery energy $E_{recup}$,
- a predefined minimum and/or maximum of this electrical recovery energy $E_{recup}$,
- the current torque T, which is transmitted from the propeller to the electric motor,
- a predefined minimum and/or maximum of this torque T,
- flight altitude and outside temperature, and
- angle of attack of the propeller blades.

According to an advantageous development of the method, an input IN2 into a second input interface specifies a rotational speed $RPM_E$ of the electric motor E or a rotational speed $RPM_P$ of the propeller.

The first unit advantageously adjusts the torque T acting on the electric motor E by adjusting the electrical energy flow to/from the electric motor and/or by adjusting an angle of attack of the propeller blades of the propeller.

According to an advantageous development of the proposed method, there is a sink for electrical recovery energy $E_{recup}$ and/or a storage for electrical recovery energy $E_{recup}$, wherein the sink and/or the storage are connected to the energy management system, and wherein the energy management system controls the usage of the electrical recovery energy $E_{recup}$ The storage for electrical recovery energy $E_{recup}$ is advantageously an electric battery, or a flywheel, or a hydrogen tank. Advantageously, the electric battery in propulsion mode PM provides electrical energy for driving the electric motor E. The sink for electrical recovery energy $E_{recup}$ is advantageously an air conditioning system of the aircraft, and/or an electrical heating system of the aircraft, and/or an electrical deicing system of the aircraft. Advantageously, the energy management system directs all of the generated electrical recovery energy $E_{recup}$ in the recovery mode PM into the storage for electrical recovery energy $E_{recup}$ until a predefined maximum storage capacity of the storage is reached, and then to the sink for electrical recovery energy $E_{recup}$. Alternatively, the energy management system directs the generated electrical recovery energy $E_{recup}$ in the recovery mode PM to the storage for electrical recovery energy $E_{recup}$ and/or to the sink for electrical recovery energy $E_{recup}$ depending on an aircraft state. The aircraft state is advantageously determined by at least one from the following list:

configuration of the aircraft,
kinematic state of the aircraft,
state of the electrical system of the aircraft,
aerodynamic state of the aircraft,
physical state of the atmosphere surrounding the aircraft, and
structural boundary conditions, e.g., rotational speed limit of the propeller.

The first unit advantageously uses the envelope to control the torque T acting on the electric motor. The first unit advantageously determines $Max(T_+)$ of the envelope based on the current rotational speed $RPM_E$ of the electric motor E. The selection unit advantageously determines $Min(T_-(RPM_E))$ of the envelope based on a rotational speed $RPM_P$ of the propeller Pt, while during a flight the following applies: $RPM_P \neq 0$.

An advantageous further development of the proposed method is characterized in that a display unit is present, wherein the display unit displays one or more of the following information:

information about a negative torque $T_-$ with which the electric motor E is driven,
a parameter that depends on $T_-$,
information about a positive torque $T_+$ with which the propeller P is driven by the electric motor,
a parameter that depends on $T_+$,
information about the current mode AM, and
the currently generated electrical recovery energy $E_{recup}$ or a quantity derived from it.

Advantages and explanations of the proposed method result from an analog and analogous transmission of the statements made above for the proposed drive system.

The object of the invention is further achieved by a computer system having a data processing device, the data processing device being designed in such a way that a method, as explained above, is carried out on the data processing device.

In addition, the object of the invention is achieved by a digital storage medium with electronically readable control signals, wherein the control signals are able to interact with a programmable computer system such that a method as described above is carried out.

Finally, the invention relates to a computer program with program codes for performing the method, as described above, when the program runs on a data processing device. For this purpose, the data processing device can be configured as any computer system known from the prior art.

BRIEF DESCRIPTION OF THE DRAWINGS

Further advantages, features and details result from the following description, in which—if necessary with reference to the drawings—at least one example embodiment is described in detail. Identical, similar, and/or functionally identical parts are provided with the same reference numerals.

In the drawings.

DETAILED DESCRIPTION

Figure 1:
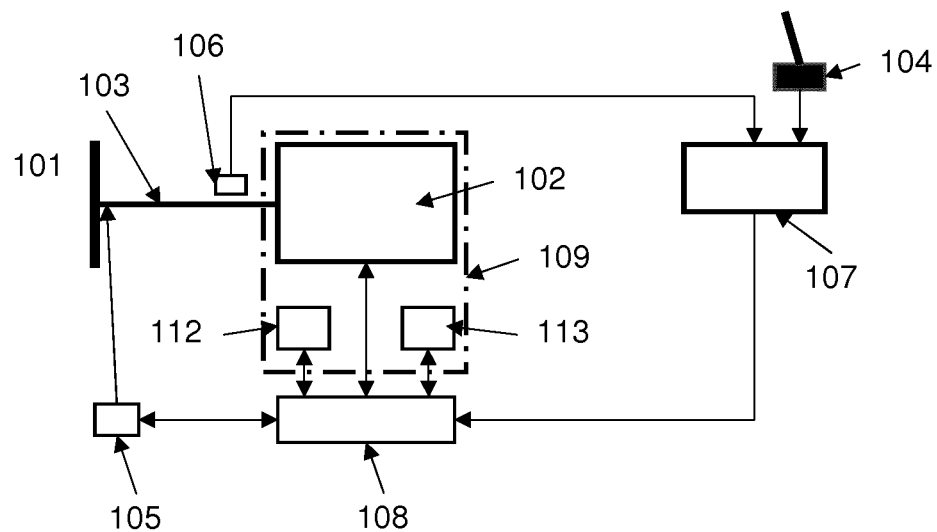
FIG. 1 shows a schematic representation of a drive system according to the invention.

FIG. 1 shows a schematic representation of a drive system according to the invention for an aircraft. The drive system has: a propeller P 101 with two propeller blades, an electric motor E 102, a transmission system 103 to mechanically transmit a positive torque $T_+$ from the electric motor E 102 to drive the propeller P 101 and to transmit a negative torque T from the propeller P 101 in a windmill braking state to drive the electric motor E 102.

The drive system furthermore has a first input interface 104, which includes a selector lever to input an input IN1, and a first unit 105 to control a torque T acting on the electric motor E 102, where: $T \in \{T_-, 0, T_+\}$ and $T_- \geq 0$ and $T_+ \geq 0$. In the present case, the first unit 105 controls the angle of attack of the propeller blades and, via the energy management system, an energy flow from or to the electric motor E 102.

The drive system further includes a second unit 106 to detect a rotational speed $RPM_E$ of the electric motor E 102; a selection unit 107 to select an active mode AM from a propulsion mode PM and a recovery mode RM, where $AM \in \{PM, RM\}$, wherein the electric motor E (102) generates electrical recovery energy $E_{recup}$ in the recovery mode RM; and an energy management system 108 to control an energy flow in an electrical system 109 of the aircraft, the system including the electric motor E 102, according to the active mode AM; In addition to the electric motor E 102, the electrical system 109 includes a sink 112 to electrically recover energy $E_{recup}$, in the present case an electric cabin heater, and a storage 113 to electrically recover energy $E_{recup}$, in the present case an electrical battery.

The selection unit 107 is configured and designed in such a way that the active mode AM is selected according to an input IN1 in the first input interface 104, according to the rotational speed $RPM_E$ of the electric motor E 102 and according to a predefined envelope, wherein the envelope indicates a maximum positive torque $Max(T_+)$ and a minimum negative torque $Min(T_-(RPM_E))$ that depends on a rotational speed $RPM_E$ of the electric motor E 102, or respective values that depend on same, wherein, for the torque T acting on the electric motor E 102, $T=T(RPM_E) \in [Min(T_-(RPM_E)), \ldots, Max(T_+)]$.

In the present case, the input IN1 represents a percentage P: $P=P(IN1) \in [0\% \ldots 100\%]$. Furthermore, the selection unit 107 is configured and designed in such a way that the recovery mode RM is selected as the active mode AM, when the percentage P(IN1) in relation to the value range $[Min(T_-(RPM_E)), \ldots, MAX(T_+)]$ represents a negative torque $T(IN1,RPM_E)$, for which $T_-=T(IN1,RPM_E)<0$ and/or $T(IN1,RPM_E)<T-*$, where $T-*<0$ indicates a limit for a negative torque $T_-$, and where: P(IN1)=0% represents $Min(T_-(RPM_E))$ and P(IN1)=100% represents $MAX(T_+)$.

The arrows indicated in FIG. 1 between the specified units indicate a flow of information and/or an interaction between the units.

Figure 2:
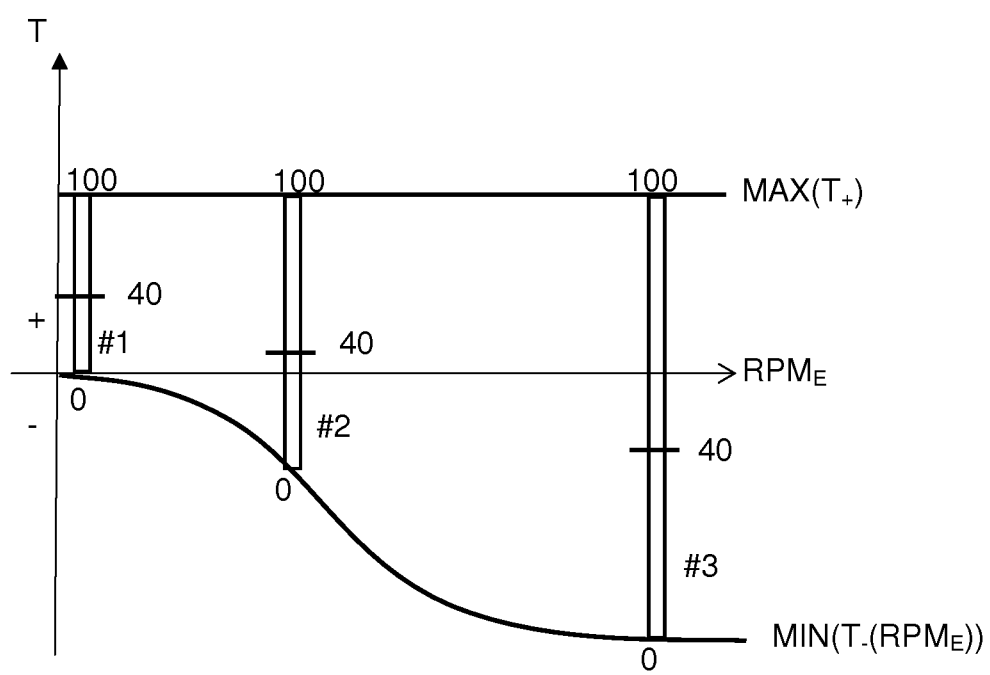
FIG. 2 shows a representation to explain the operation of the selection unit.

FIG. 2 shows a representation to explain the mode of operation of the selection unit 107 described in FIG. 1. A coordinate system is shown in which the rotational speed $RPM_E$ of the electric motor E 102 is plotted along the horizontal axis running to the right, wherein the rotational speed $RPM_E$ in the coordinate origin is zero and increasing to the right. The torque T acting on the electric motor E 102 is plotted along the vertical axis. A positive torque $T=T_+>0$ is plotted above the horizontal axis, and a negative torque $T=T_-<0$ is plotted below the horizontal axis. The maximum values $MAX(T_+)$ or minimum values $Min(T_-(RPM_E))$ characterizing the envelope are entered in the coordinate system. It can be clearly seen that $MAX(T_+)$ defines a constant torque, i.e., is independent of the rotational speed $RPM_E$ of the electric motor E 102. It can also be clearly seen that $Min(T_-(RPM_E))$ depends on the rotational speed $RPM_E$. The envelope limits on the one hand a positive torque $T_+$ transmitted from the electric motor E 102 to the propeller P 101, and on the other hand a negative torque $T_-$ transmitted from the propeller P 101 to the electric motor E 102. $Min(T_-(RPM_E))$ thus also defines a maximum absorbable torque for the recovery of electrical recovery energy $E_{recup}$.

The three vertical bars shown indicate value ranges [Min $(T_-(RPM_E))$, ..., $MAX(T_+)$] for three different rotational speeds $RPM_E$, from which torques acting on the electric motor E 102 may be generated. If an input IN1 is made by a pilot at the first input interface 104, which corresponds to a percentage P=P(IN1)=0%, the maximum torque that can be absorbed for the recovery of electrical recovery energy E is obtained by the curve for $Min(T_-(RPM_E))$. If an input IN1 is made by a pilot at the first input interface 104, which corresponds to a percentage P=P(IN1)=100%, the maximum torque transmitted from the electric motor E 102 to the propeller is limited by the curve $MAX(T_+)$. If an input IN1 is now made by a pilot on the first input interface 104, which corresponds to a percentage P=P(IN1)=40%, this percentage represents 40% in relation to the value-dependent range of values [Min($T_-(RPM_E)$), ..., $MAX(T_+)$] in case #1 a torque $T=T_+=T(IN1, RPM_E)>0$ of almost 40% of the allowed maximum positive torque $MAX(T_+)$, in case #2 a torque $T=T_+=T(IN1, RPM_E)>0$ of approx. 10% of the allowed maximum positive torque $MAX(T_+)$ and in case #3 a torque $T=T_-=T(IN1, RPM E)<0$. In case #3, the pilot has set the lever of the first input interface 104 to 40% (e.g., power), but for example by initiating a strong descent and the torque input caused by the incoming air on the propeller P 101, the propeller P is not driven by the electric motor E 102 in this state 101, but the other way around, the propeller P 101 drives the electric motor E 102.

In the present case, the selection unit 107 is designed and set up in such a way that the recovery mode RM is selected as the active mode AM when the percentage P(IN1) related to the value range [Min($T_-(RPM_E)$), ..., $MAX(T_+)$] represents a negative torque $T(IN1,RPM_E)$, for which $T{-}=T(IN1, RPM_E)<0$.

In the present case, the selection of the active mode AM is carried out automatically.

Although the invention has been illustrated and explained in greater detail using preferred example embodiments, the invention is not limited by the disclosed examples and other variations may be derived therefrom by a person skilled in the art without departing from the scope of protection of the invention. It is therefore clear that there is a variety of possible variations. It is also clear that embodiments cited by way of example actually only constitute examples that are not to be interpreted in any way as a limitation of the scope, of the potential applications, or of the configuration of the invention. Instead, the preceding description and the description of the figures enable the person skilled in the art to specifically implement the example embodiments, the person skilled in the art having knowledge of the disclosed inventive concept being able to make numerous changes, for example, with respect to the function or the arrangement of individual elements cited in an example embodiment, without departing from the scope of protection, which is defined by the claims and their legal equivalents, such as a further explanation in the description.

LIST OF REFERENCE NUMERALS

101 propeller P
102 electric motor E
103 transmission system
104 first input interface
105 first unit
106 second unit
107 selection unit
108 energy management system
109 electrical system
110 third unit
111 display unit
112 sink for electrical recovery energy $E_{recup}$
113 storage for electrical recovery energy $E_{recup}$

The invention claimed is:

1. A drive system for an aircraft, the system comprising:
a propeller P having propeller blades;
an electric motor E;
a transmission system to mechanically transmit a positive torque $T_+$ from the electric motor E to drive the propeller P and to transmit a negative torque $T_-$ from the propeller P in a windmill braking state to drive the electric motor E;
a first input interface to input an input IN1 that defines power to be output by the electric motor E to drive the propeller P;
an electronic controller to control a torque T acting on the electric motor E, where $T\epsilon\{T_-, 0, T_+\}$ and $T_-\leq 0$ and $T_+\geq 0$;
a speed sensor to detect a rotational speed $RPM_E$ of the electric motor E;
an electronic selector to select an active mode AM from a propulsion mode PM and a recovery mode RM, where $AM\epsilon\{PM, RM\}$, wherein in the recovery mode RM the electric motor E generates electrical recovery energy $E_{recup}$ from the negative torque $T_-$ transmitted by the transmission system from the propeller P; and
an energy management system to control electrical energy flow in an electrical system of the aircraft, the electrical system comprising the electric motor E, according to the active mode AM;
wherein the electronic selector is configured such that the active mode AM is selected automatically according to the input IN1, the rotational speed $RPM_E$ of the electric motor E, and a predefined envelope, wherein the predefined envelope indicates a maximum positive torque $Max(T_+)$ and a minimum negative torque $Min(T_-(RPM_E))$ that depends on the rotational speed $RPM_E$ of the electric motor E, or respective values that depend on same, wherein, for the torque T acting on the electric motor E, $T=T(IN1,RPM_E)\epsilon[Min(T_-(RPM_E)), ..., Max(T_+)]$.

2. The drive system according to claim 1, wherein the input IN1 represents a percentage P: $P(IN1)\epsilon[0\% ... 100\%]$, and the electronic selector is configured such that the recovery mode RM is selected as the active mode AM, when the percentage P(IN1) in relation to a value range [Min($T_-(RPM_E)$), ..., $MAX(T_+)$] represents a negative torque $T(IN1,RPM_E)$, for which $T_-=T(IN1,RPM_E)<0$ and/or $T(IN1,RPM_E)<T_-^*$, where $T_-^*<0$ indicates a limit for the negative torque $T_-$, and where $P(IN1)=0\%$ represents $\text{Min}(T_-(RPM_E))$ and $P(IN1)=100\%$ represents $\text{MAX}(T_+)$.

3. The drive system according to claim 1, wherein the system comprises a torque sensor to detect the torque T acting on the electric motor E.

4. The drive system according to claim 3, wherein the electronic controller is configured to control a negative torque $T=T_-$ acting on the electric motor E according to at least one from the following list:
- an energy content of a battery connected to the electric motor E,
- a charging current to a battery connected to the electric motor E,
- a predefined minimum and/or maximum of the charging current,
- a temperature of the electric motor E and/or a battery,
- a predefined minimum and/or maximum of the temperature,
- a state of the electric motor E and/or the battery,
- a predefined minimum and/or maximum of the state,
- a current and/or a predefined speed of the aircraft,
- a predefined minimum and/or maximum of the speed,
- a current and/or predefined sink rate of the aircraft,
- a predefined minimum and/or maximum of the sink rate, from the input IN1,
- a rotational speed of the propeller P and/or of the electric motor E,
- a predefined minimum and/or maximum of the rotational speed,
- a currently generated electrical recovery energy $E_{recup}$,
- a predefined minimum and/or maximum of the currently generated electrical recovery energy $E_{recup}$,
- a current torque T transmitted from the propeller P to the electric motor E,
- a predefined minimum and/or maximum of the current torque T,
- a flight altitude and outside temperature, and
- an angle of attack of the propeller blades.

5. The drive system according to claim 4, wherein the electronic controller is configured to control the torque T acting on the electric motor E by adjusting the electrical energy flow to/from the electric motor E and/or by adjusting the angle of attack of the propeller blades of the propeller P.

6. The drive system according to claim 1, wherein the system comprises a sink for the electrical recovery energy $E_{recup}$ and/or a storage for the electrical recovery energy $E_{recup}$, wherein the sink and/or the storage are connected to the energy management system, and wherein the energy management system is configured to control usage of the electrical recovery energy $E_{recup}$ with respect to the sink and/or the storage.

7. The drive system according to claim 1, wherein the system comprises a display unit, the display unit configured to display one or more of the following information:
- information about the negative torque $T_-$ with which the electric motor E is driven,
- a parameter that depends on the negative torque $T_-$,
- information about a positive torque $T_+$ with which the propeller P is driven by the electric motor E,
- a parameter that depends on the positive torque $T_+$,
- information about a current mode AM, and
- a currently generated electrical recovery energy $E_{recup}$ or a quantity derived from the currently generated electrical recovery energy $E_{recup}$.

8. An aircraft comprising a drive system, the drive system comprising:
- a propeller P having propeller blades;
- an electric motor E;
- a transmission system to mechanically transmit a positive torque $T_+$ from the electric motor E to drive the propeller P and to transmit a negative torque $T_-$ from the propeller P in a windmill braking state to drive the electric motor E;
- a first input interface to input an input IN1 that defines power to be output by the electric motor E to drive the propeller P;
- an electronic controller to control a torque T acting on the electric motor E, where $T \in \{T_-, 0, T_+\}$ and $T_- \leq 0$ and $T_+ \geq 0$;
- a speed sensor to detect a rotational speed $RPM_E$ of the electric motor E;
- an electronic selector to select an active mode AM from a propulsion mode PM and a recovery mode RM, where $AM \in \{PM, RM\}$, wherein in the recovery mode RM the electric motor E generates electrical recovery energy $E_{recup}$ from the negative torque $T_-$ transmitted by the transmission system from the propeller P; and
- an energy management system to control energy flow in an electrical system of the aircraft, the electrical system comprising the electric motor E, according to the active mode AM;

wherein the electronic selector is configured such that the active mode AM is selected automatically according to the input IN1, the rotational speed $RPM_E$ of the electric motor E, and a predefined envelope, wherein the predefined envelope indicates a maximum positive torque $\text{Max}(T_+)$ and a minimum negative torque $\text{Min}(T_-(RPM_E))$ that depends on the rotational speed $RPM_E$ of the electric motor E, or respective values that depend on same, wherein, for the torque T acting on the electric motor E, $T=T(IN1,RPM_E) \in [\text{Min}(T_-(RPM_E)), \ldots, \text{Max}(T_+)]$.

9. The aircraft according to claim 8, wherein the input IN1 represents a percentage P: $P(IN1) \in [0\% \ldots 100\%]$, and the electronic selector is configured such that the recovery mode RM is selected as the active mode AM, when the percentage P(IN1) in relation to a value range $[\text{Min}(T_-(RPM_E)), \ldots, \text{MAX}(T_+)]$ represents a negative torque $T(IN1,RPM_E)$, for which $T_-=T(IN1,RPM_E)<0$ and/or $T(IN1,RPM_E)<T-^*$, where $T-^*<0$ indicates a limit for the negative torque $T_-$, and where: $P(IN1)=0\%$ represents $\text{Min}(T_-(RPM_E))$ and $P(IN1)=100\%$ represents $\text{MAX}(T_+)$.

10. The aircraft according to claim 8, wherein the drive system comprises a torque sensor to detect the torque T acting on the electric motor E.

11. The aircraft according to claim 10, wherein the electronic controller is designed and set up to control a negative torque $T=T_-$ acting on the electric motor E according to at least one from the following list:
- an energy content of a battery connected to the electric motor E,
- a charging current to a battery connected to the electric motor E,
- a predefined minimum and/or maximum of the charging current,
- a temperature of the electric motor E and/or a battery,
- a predefined minimum and/or maximum of the temperature,
- a state of the electric motor E and/or the battery,
- a predefined minimum and/or maximum of the state,
- a current and/or a predefined speed of the aircraft, a predefined minimum and/or maximum of the speed,
a current and/or predefined sink rate of the aircraft,
a predefined minimum and/or maximum of the sink rate, from the input IN1,
a rotational speed of the propeller P and/or of the electric motor E,
a predefined minimum and/or maximum of the rotational speed,
a currently generated electrical recovery energy $E_{recup}$,
a predefined minimum and/or maximum of the currently generated electrical recovery energy $E_{recup}$,
a current torque T transmitted from the propeller P to the electric motor E,
a predefined minimum and/or maximum of the current torque T,
a flight altitude and outside temperature, and
an angle of attack of the propeller blades.

12. The aircraft according to claim 11, wherein the electronic controller is configured to control the torque T acting on the electric motor E by adjusting the electrical energy flow to/from the electric motor E and/or by adjusting the angle of attack of the propeller blades of the propeller P.

13. The aircraft according to claim 8, wherein the drive system comprises a sink for the electrical recovery energy $E_{recup}$ and/or a storage for the electrical recovery energy $E_{recup}$, wherein the sink and/or the storage are connected to an energy management system, and wherein the energy management system is configured to control usage of the electrical recovery energy $E_{recup}$ with respect to the sink and/or the storage.

14. The aircraft according to claim 8, wherein the drive system comprises a display unit, the display unit configured to display one or more of the following information:
information about the negative torque $T_-$ with which the electric motor E is driven,
a parameter that depends on the negative $T_-$,
information about a positive torque $T_+$ with which the propeller P is driven by the electric motor E,
a parameter that depends on the positive torque $T_+$,
information about a current mode AM, and
a currently generated electrical recovery energy $E_{recup}$ or a quantity derived from the currently generated recovery energy $E_{recup}$.

15. A method of operating a drive system for an aircraft, the drive system comprising:
a propeller P having propeller blades;
an electric motor E;
a transmission system to mechanically transmit a positive torque $T_+$ from the electric motor E to drive the propeller P and to transmit a negative torque T from the propeller P in a windmill braking state to drive the electric motor E;
a first input interface to input an input IN1 that defines power to be output by the electric motor E to drive the propeller P;
an electronic controller to control a torque T acting on the electric motor E, where $T \in \{T_-, 0, T_+\}$ and $T_- \leq 0$ and $T_+ \geq 0$;
a speed sensor to detect a rotational speed $RPM_E$ of the electric motor E;
an electronic selector to select an active mode AM from a propulsion mode PM and a recovery mode RM, where $AM \in \{PM, RM\}$, wherein in the recovery mode RM the electric motor E generates electrical recovery energy $E_{recup}$ from the negative torque $T_-$ transmitted by the transmission system from the propeller P; and
an energy management system to control energy flow in an electrical system of the aircraft, the system comprising the electric motor E, according to the active mode AM;
wherein the method comprises selecting the active mode AM by the electronic selector automatically according to the input IN1, the rotational speed $RPM_E$ of the electric motor E, and a predefined envelope, wherein the predetermined envelope indicates a maximum positive torque $Max(T_+)$ and a minimum negative torque $Min(T_-(RPM_E))$ that depends on the rotational speed $RPM_E$ of the electric motor E, or respective values that depend on same, wherein, for the torque T acting on the electric motor E, $T=T(IN1,RPM_E) \in [Min(T_-(RPM_E)), \ldots, Max(T_+)]$.

16. The method according to claim 15, wherein the input IN1 represents a percentage P: $P(IN1) \in [0\% \ldots 100\%]$, wherein the method comprises selecting the recovery mode RM by the electronic selector as the active mode AM, when the percentage P(IN1) in relation to a value range $[Min(T_-(RPM_E)), \ldots, MAX(T_+)]$ represents a negative torque $T(IN1,RPM_E)$, for which $T_-=T(IN1,RPM_E)<0$ and/or $T(IN1,RPM_E)<T-*$, where $T-*<0$ indicates a limit for the negative torque $T_-$, and where: $P(IN1)=0\%$ represents $Min(T_-(RPM_E))$ and $P(IN1)=100\%$ represents $MAX(T_+)$.

* * * * *